C. W. HEATH AND W. P. CONLIN.
RAILWAY FARE RECEIPT TICKET.
APPLICATION FILED MAR. 27, 1919.

1,325,941.

Patented Dec. 23, 1919.

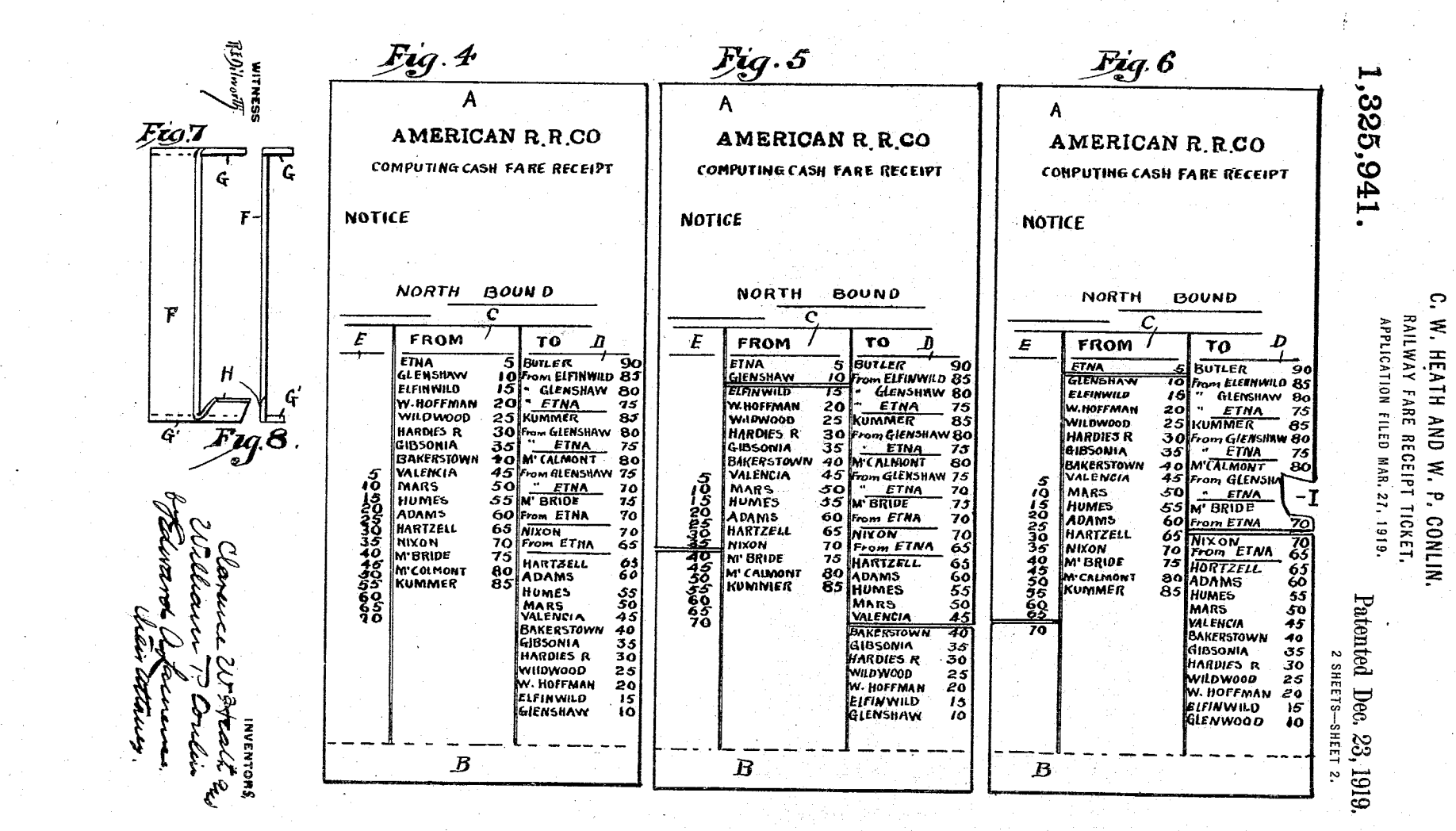

C. W. HEATH AND W. P. CONLIN.
RAILWAY FARE RECEIPT TICKET.
APPLICATION FILED MAR. 27, 1919.

1,325,941.

Patented Dec. 23, 1919.
2 SHEETS—SHEET 2.

UNITED STATES PATENT OFFICE.

CLARENCE W. HEATH AND WILLIAM P. CONLIN, OF BELLEVUE BOROUGH, PENNSYLVANIA.

RAILWAY FARE-RECEIPT TICKET.

1,325,941.    Specification of Letters Patent.    Patented Dec. 23, 1919.

Application filed March 27, 1919. Serial No. 285,595.

*To all whom it may concern:*

Be it known that we, CLARENCE W. HEATH and WILLIAM P. CONLIN, citizens of the United States, and residing in the borough of Bellevue, in the county of Allegheny and State of Pennsylvania, have invented or discovered new and useful Improvements in Railway Fare-Receipt Tickets, of which the following is a specification.

Our invention comprises a new and improved fare receipt tickets for railways.

More particularly our invention relates to the form of ticket which the conductor or ticket agent, when he is paid by the passenger, tears into two parts, one of which parts is handed to the passenger as a receipt while the other part is turned into the railway auditor.

The object in view is the provision of such a ticket which the conductor can quickly and intelligently issue, which the passenger can readily understand, and which will prevent misapplication of funds by the conductor.

Generally speaking, our improved ticket is of the following character. The ends of the ticket are solid, one being a perforated stub to permit the padding of the tickets, and the other or top portion containing the name of the railway, the necessary explanatory matter and terms of use and the direction of travel, such as "northbound" or "southbound" for which the ticket is intended. The intermediate portion of the ticket is slit longitudinally to form two or more separated columns. One column is the departure or "from" column and contains a vertically disposed list of stations beginning with the departure terminal but omitting the destination terminal of the route. The second column is the "destination" column containing a vertically disposed list of the stations, arranged in reverse order to that of departure column, beginning with the destination terminal and omitting the departure terminal. We prefer also to provide a third column, called the "fare" column which contains a progressively increasing list of all the fare amounts collectible between the departure terminal and the destination terminal. Each station name in the departure column has a number associated with it, as has also each station name in the destination column, and these numbers are of such relative value that when the number associated with a departure station is subtracted from a number associated with a destination station, the result will be the amount of the fare between said stations.

When the conductor receives a cash fare, he tears the ticket across the three columns. He tears the departure column just under the name of the station at which the passenger embarked; the destination column just under the name of the station at which the passenger is to disembark, and the fare column just under the amount of cash fare the passenger has paid, handing the top of the ticket to the passenger as a cash fare receipt, while the bottom portion is turned in at the proper time to the railway auditor. If the ticket has been properly severed, the passenger's receipt will show the station where the passenger got on at the bottom of the departure column, the station where he will get off at the bottom of the destination column, and the difference between the numbers at the bottoms of said two columns will equal the fare amount at the bottom of the fare column.

A difficulty arises in the use of a ticket of the above character where there are "overlaps." This term is used to indicate cases where the fare from one or more departure stations to two or more destination stations is the same while the fare from other departure stations to said destination stations differs. Thus the fare from station A to stations X and Y may be the same but the fare from station B to station X may be less than the fare from station B to station Y. For the sake of clearness, in such cases we call the departure station, A, "overlapping departure station", and the destination stations, X and Y, the "overlapped destination stations". This difficulty we overcome by giving an overlapped station in the destination column, in addition to its normal number from which the numbers of non-overlapping departure stations are to be deducted to obtain the amount of fare, an additional number for each of its overlapping departure stations of such value that when the number of such overlapping departure station is subtracted therefrom the proper fare is the result. The tear in the destination column is then made under such additional overlap number.

This additional number is of course the same as the numeral of the other overlapped destination station, and therefore the same number may occur two or more times in the destination column. Thus, the conductor might pick up a fare receipt, thrown away by a passenger and retear the destination column, leaving another destination station as the bottom name in the destination column, the destination number now at the bottom being the same as that originally shown. The return receipt could then be issued a second time and the fare collected pocketed by the conductor.

In our preferred form, we avoid this danger by printing under the names of the overlapping departure stations the word "to" and the overlapped destination station or stations, also placing opposite thereto the number of the departure station. This enables us to make a straight horizontal tear in the destination column, so that a less expensive quality of paper can be used than would be required if notching were resorted to.

In the accompanying drawings, which are merely intended to illustrate the principles of our invention without limiting the scope of the same to the arrangement shown, Figure 1 is a view showing our preferred form of ticket; Fig. 2 shows the same torn for a passage between an overlapping departure station and an overlapped destination station; Fig. 3 shows the ticket torn for a passage between non-overlapping stations; Fig. 4 shows a modified form of our ticket; Fig. 5 shows the same torn for a passage between non-overlapping stations; Fig. 6 shows the same torn for a passage between an overlapping departure station and an overlapped destination station; Fig. 7 is a plan view of the form of sliding rule which we provide for use in connection with out modified form of tickets, and Fig. 8 is an elevation of the same.

The following is a detailed description of the drawings, reference being first had to Figs. 1, 2 and 3.

The ticket is a strip of paper upon the top end, A, of which is printed the name of the railroad, the direction in which the ticket is to be used, such as "northbound," and such data and directions as may be deemed necessary for the information of the conductors and passengers. The lower end, B, is a narrow, perforated strip by means of which the tickets may be attached together in pads of convenient size.

The intermediate portion of the ticket, between portions A and B is slit or cut longitudinally into two or preferably three portions or columns, C, D and E.

Column C is the departure or "from" column and contains a list of stations beginning with the departure terminal and running down through the list of stations to, but omitting, the destination terminal. Column D is a reversely arranged list of the stations beginning with and including the destination terminal but omitting the departure terminal. Opposite each departure station is printed a number, and opposite each destination station is printed a number, the numbers being such that by subtracting the number of a departure station from the number of a destination station the result obtained will be the fare between said stations. In the ticket illustrated the fare increases are by five or multiples thereof, but it will be understood that where the increases in fare are of less, greater or varying amounts, the numbers are adjusted accordingly to give the proper results from the subtractions of the departure numbers from the destination numbers. The third column E contains the fare amounts.

The columns may be arranged in any desired order, and if desired the column E may be omitted, but we prefer to use all three columns, as shown.

An overlap occurs where the fares from a given departure station, which we term for convenience an "overlapping departure station," to two or more destination stations, termed "overlapping destination stations" are the same, while the fares from some of the other departure stations to said destination stations are in each case different. Thus the fare from Glenshaw to McCalmont, and from Glenshaw to McBride is the same, sixty-five cents, but the fare from Gibsonia to McCalmont is forty-five cents, while the fare from Gibsonia to McBride is forty cents. Therefore one of the overlapped destination stations must be provided with more than one number to calculate the proper fares in each case. Thus opposite the name of the overlapped station in the destination column, we place the proper numeral to give the amount of fare from non-overlapping stations in the departure column. Thus opposite McCalmont, we place the number 80 so that when a passenger enters the car at Gibsonia the fare to McCalmont is obtained by subtracting Gibsonia's departure number 35 in column C from McCalmont's normal destination number 80 in column D, but under the word McCalmont in column D we print the word "From" and under it the names of the departure stations which are overlapping to McCalmont, which happen to be in the illustration given Glenshaw and Etna, and we print opposite the names Glenshaw and Etna in column D the proper numerals to obtain by subtracting therefrom the Glenshaw and Etna numerals in column C the proper fare amounts. Thus McBride has the normal numeral 75 in column D while McCalmont's normal number in column D is 80, but under McCalmont in column D is printed the words "From" and "Glenshaw" and opposite the latter the numeral 75, so that when the number 10 opposite Glenshaw in column C is subtracted in either case, it will give the same result or 65 cents.

For convenience in column C we arrange the overlapping departure stations in individual blocks. Thus "Block 1" is the Etna block containing on the top line the word "Etna" with the number 5 opposite the same. Then the word "To" and under it in order the corresponding overlapped destination stations, "Nixon," &c, with the Etna number 5 printed opposite each of them.

The column E or fare column is in two parts, one part, the upper part in the ticket shown in Figs. 1, 2 and 3 contains a vertical list, downwardly increasing of the various fare amounts, which are assumed for the sake of illustration to begin at 5 cents and increase by like amounts. This portion of column E is for use in case of non-overlapping passages. The other, and in the ticket illustrated the lower portion of column E consists of a list of the overlapping departure stations with the overlapped destination stations printed horizontally opposite them together with the correct fare between said stations. Thus, we show from Elfinwild to Butler 70 cents.

The ticket is used as follows. Assuming a passenger gets on at Wildwood and rides to Humes, involving no overlap, the conductor collects 30 cents and tears a ticket as shown in Fig. 3, under Wildwood in column C, under Humes in column D and under 30 in the upper portion of column E, thus completely severing the ticket into two parts, the upper portion of which he hands to the passenger as a receipt, while the lower portion is retained to be handed into the auditor. Referring to the upper or receipt portion it will appear that the last words in column C are "Wildwood 25" and in column D "Humes 55", indicating departure and destination points and the difference between said numbers is 30, the cash fare indicated at the bottom of the column E of the receipt. The conductor cannot pick up the receipt, should the passenger throw it away, and retear it for issue for another fare paid between any other combination of stations since the arrangement of the station names and numbers in the columns C, D and E is such that if he attempts to retear any one or more of the columns of the receipt he cannot get the difference between bottom numbers in columns C and D to correspond to any remaining number in column E, as the numbers in column E diminish upwardly, while as additional names are torn from columns C and D, the difference between the bottom numbers of said columns C and D increase. Thus no balancing or correspondence is possible.

Where an overlap passage, such as from Glenshaw to McCalmont is paid for, the conductor tears the ticket as shown in Fig. 2 and collects 65 cents, giving the upper portion of the ticket as a receipt to the passenger. In such case the tear is just below "McCalmont 10" in block 2 of column C, just below "Glenshaw 75" under "McCalmont" in column D and just below "Glenshaw 65 McCalmont" in column E. In this case likewise no retearing will make the difference between the bottom figures in columns C and D of the receipt correspond with the bottom figures in the column E of the receipt.

Where the overlapping departure stations are grouped adjacent to the departure end of the route, then the cash fares for the overlaps should be printed below the cash fares for the non-overlap, as shown in Figs. 1, 2 and 3 but where as in the case of some railways, the overlaps occur intermediate of the route, then the overlap cash fares should be printed above the non-overlap fares in column E.

In the modified form of ticket shown in Figs. 4, 5 and 6, in column C the names of the departure stations are simply printed in proper order with the proper number opposite each to give the proper fare result when subtracted from the number of the destination stations in column D. In the case of overlaps, which in the modified form of ticket are indicated only in the destination column D, it is necessary to mutilate the numbers in column D, identical with the bottom number of the column on the receipt, which occur above to prevent retearing and reissue of the receipt.

In this form of ticket the column E contains only a descendingly increasing list of fares.

If a passenger pays for a passage from Glenshaw to Valencia, involving no overlap, column E is torn just below the amount 35, showing that a corresponding fare has been paid, column C is torn just below Glenshaw showing the departure station, and column D is torn just below Valencia showing the destination station, and the difference between the bottom number, 10, of column C and the bottom number, 45, of column D is 35, which checks with the bottom number in column E. The ticket thus torn is shown in Fig. 5. In Fig. 6 I show the ticket torn for a fare paid between Etna and McBride, involving an overlap, the fare from Etna to McBridge being the same as from Etna to McCalmont. The ticket is torn in this case under "65" in column E, under "Etna 5" in column C and under "From Etna 70" just below "McBride" in column D. However, the numeral 70 is repeated above in column D opposite "From Etna" under "McCalmont" and to prevent the conductor salvaging the receipt, retearing it to indicate a passage from Etna to McCalmont, it is necessary to notch the side of column D above its line of tear, so that the reoccurrence of the numeral 70 is destroyed.

Thus an ordinary straight edge rule may be slid over the pad into the proper positions to tear the form of receipt shown in Figs. 1, 2 and 3 and a receipt for a non-overlap passage, as shown in Fig. 5. But where a passage involving an overlap, as in Fig. 6 is to be indicated, we prefer to use the form of sliding rule illustrated in Figs. 7 and 8 wherein F is a straight edge with a sharp cutting edge, capable of being slid up and down the pad into proper position and provided at its ends with depending flanges G and G', which engage the edges of the pad and keep the straight edge in proper alinement. H is an angular cutting ear, integral with the flange G' and extending over the edge of the column D, and provided with a sharpened cutting perimeter or edge, so that by a twist of the paper before the column D is torn across and severed a notch I may be torn in the side of said column destroying the numerals in said column above and corresponding to the bottom numeral in said column when the column is torn across. Thus the conductor could not salvage a receipt issued for a passage from Etna to McBride and retear column D to show a passage from Etna to McCalmont, pocketing the money, since the necessary numeral higher up in column D has been notched out.

It is evident from the foregoing that our improved ticket insures for all practical purposes against dishonesty on the part of the conductor or ticket seller. It is true that nothing prevents a conductor, who has found a discarded receipt, from reissuing said receipt on the same or another trip for a passage between the same points and in the same direction, but the conductor is unlikely to reissue an old receipt unless he can retear the same in some manner, since the handing to the passenger of an already torn receipt at once advertises a dishonest act, but as soon as he attempts to retear one of our passenger's receipts, he destroys the same as the difference between the bottom numbers of the departure column and the destination column can no longer equal the bottom number of the fare column, no matter in what way any or all of the columns may be retorn.

We prefer the form of ticket shown in Figs. 1, 2 and 3, as straight lines of tear only are used and thus a less expensive quality of paper may be used.

What we desire to claim is:

1. A railway fare receipt ticket comprising a strip of paper having its intermediate portion slit into parallel columns, one column containing a list of the stations in the sequence of travel, a second column containing a list of the stations in reverse sequence, and a third column containing a list of fare amounts arranged in numerical sequence, and numbers associated with the station names in the first and second mentioned columns, said numbers being of such relative values that when a station number in the first mentioned column is deducted from a station number in the second mentioned column the result is the fare between said stations, whereby when the first mentioned column is severed below the departure station, the second mentioned column below the destination station, and the third mentioned column below the amount of fare paid, the detached portion forms a receipt wherein the difference between the station numbers at the bottoms of the first and second mentioned columns equals the amount at the bottom of the third mentioned column.

2. A railway fare receipt ticket comprising a strip of paper having its intermediate portion slit into parallel columns, one column containing a list of the stations in the sequence of travel, a second column containing a list of the stations in reverse sequence, and a third column containing a list of fare amounts arranged in numerical sequence, and numbers associated with the station names in the first and second mentioned columns, said numbers being of such relative values that when a station number in the first mentioned column is deducted from a station number in the second mentioned column the result is the fare between said stations, the numbers in the first mentioned column increasing progressively in the opposite direction to those in the second mentioned column, whereby when the first mentioned column is severed below the departure station, the second mentioned column below the destination station, and the third mentioned column below the amount of fare paid, the detached portion forms a receipt wherein the difference between the station numbers at the bottoms of the first and second mentioned column equals the amount at the bottom of the third mentioned column.

3. A railway fare receipt ticket comprising a strip of paper having its intermediate portion slit into parallel columns, one column containing a list of the stations in sequence of travel, a second column containing a list of the stations in reverse sequence, and a third column containing a list of fare amounts in numerical sequence, and numbers associated with the station names in the first and second mentioned columns, said numbers being of such relative values that when a station number in the first mentioned column is deducted from a station number in the second mentioned column the result is the fare between said stations, the numbers in said first and second mentioned columns increasing progressively in opposite directions while the amounts in the third mentioned column increase in the same direction as the numbers in the first mentioned column, whereby when said first mentioned column is severed below the departure station, the second mentioned column below the destination station, and the third mentioned column below the amount of fare collected, the detached portion forms a receipt wherein the difference between the numbers at the bottom of the first and second mentioned columns equals the amount at the bottom of the third mentioned column.

4. A railway fare receipt ticket comprising a strip of paper having its intermediate portion split to form a departure column containing a list of the stations in the sequence of travel and a destination column containing a list of stations in reverse sequence, numbers being associated with the station names in each column, said numbers being of such relative values that when the departure column number of a station is deducted from the destination column number of another station the result is the fare between said stations, and in the case of a group of two or more destination stations overlapped by a common departure station one less than the total number of stations in said group being provided, in addition to its or their normal destination number or numbers, with an additional number or numbers from which the departure column number of the common overlapping departure station is to be deducted to obtain the common overlapping fare, whereby when the departure column is severed below the name of the departure station and the destination column is severed below the name of the destination station or its overlapped destination number, a receipt is formed wherein the difference between the numbers at the bottoms of said columns will equal the fare collected.

5. A railway fare receipt ticket comprising a strip of paper having its intermediate portion split to form a departure column containing a list of the stations in the sequence of travel, a destination column containing a list of the stations in reverse sequence, and a fare column containing a list of fares charged in numerical sequence, numbers being associated with the station names in the departure and destination columns, the relative values of said numbers being such that when the number of a station in the departure column is deducted from the number of a station in the destination column the result is the fare between said stations, and in the case of a group of two or more destination stations overlapped by a common departure station, one less than the total number of stations in said group being provided, in addition to their normal destination number or numbers, with an additional number or numbers from which the departure number of the common overlapping departure station is to be deducted to obtain the common overlapping fare, whereby when the departure column is severed below the departure station name, the destination column below the destination station name or its proper overlapped destination number, and the fare column below the proper fare amount, a receipt is formed wherein the difference between the bottom numbers in its departure and destination columns equals the amount at the bottom of its fare column.

6. A railway fare receipt ticket comprising a strip of paper having its intermediate portion split to form a departure column containing a list of the stations in the sequence of travel, a destination column containing a list of the stations in reverse sequence, and a fare column containing a list of fares charged in orderly sequence, numbers being associated with the station names in the departure and destination columns, the relative values of said numbers being such that when a number of a station in the departure column is deducted from the number of a station in the destination column the result is the fare between said stations, and in case of a departure station overlapping a plurality of destination stations, the common overlapping departure station having printed under it the names of the overlapped destination stations with the same departure number as the common departure station and in the destination column one less than the total number of the corresponding group of said overlapped destination stations being provided, in addition to their normal destination number or numbers, with an additional number or numbers from which the departure number of the common overlapping departure station is to be deducted to obtain the common overlapping fare, whereby when the departure column is severed below the departure station and the destination column below the destination station or its proper overlapped number, and the fare column below the proper fare amount, a receipt is formed wherein the difference between the bottom numbers of the departure and destination columns will equal the amount at the bottom of the fare column.

7. A railway fare receipt ticket comprising a strip of paper having its intermediate portion split to form a departure column containing a list of the stations in the sequence of travel, a destination column containing a list of the stations in reverse sequence, and a fare column containing a list of non-overlapped fares in orderly sequence and a list of opposed names of departure and destination stations forming overlapping trips with the amount of fare in each case, numbers being associated with the station names in the departure and destination columns, the relative values of said numbers being such that when a number of a station in the departure column is deducted from the number of a station in the destination column the result is the fare between said stations, and in case of a departure station overlapping a plurality of destination stations, the common overlapping departure station having printed under it the names of the overlapped destination stations with the same departure number as the common departure station and in the destination column one less than the total number of the corresponding group of said overlapped destination stations being provided, in addition to their normal destination number or numbers, with an additional number or numbers from which the departure number of the common overlapping departure station is to be deducted to obtain the common overlapping fare, whereby when the departure column is severed below the departure station and the destination column below the destination station or its proper overlapped number, and the fare column below the proper fare amount, a receipt is formed wherein the difference between the bottom numbers of the departure and destination columns will equal the amount at the bottom of the fare column.

Signed at Pittsburgh, Pa., this 22nd day of March, 1919.

CLARENCE W. HEATH.
WILLIAM P. CONLIN.